UNITED STATES PATENT OFFICE.

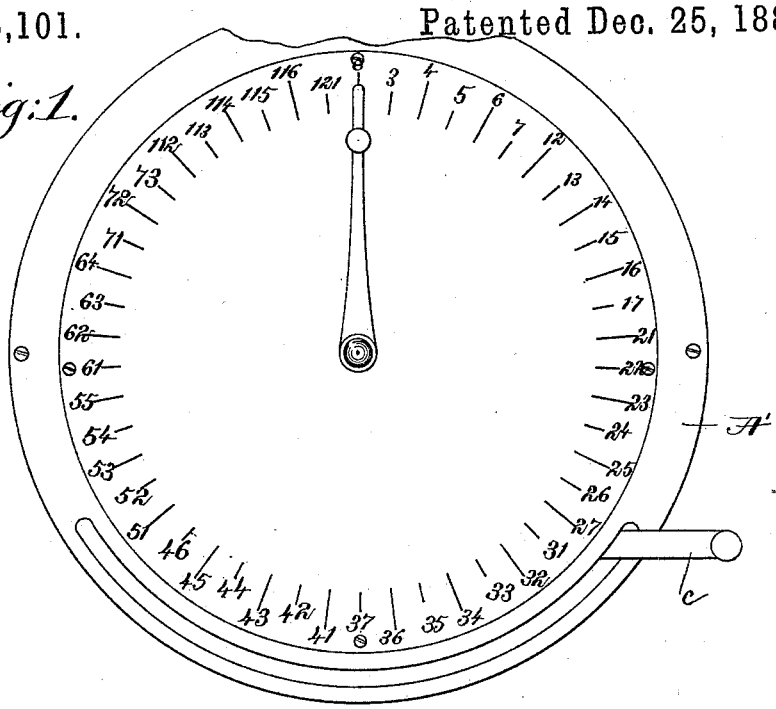

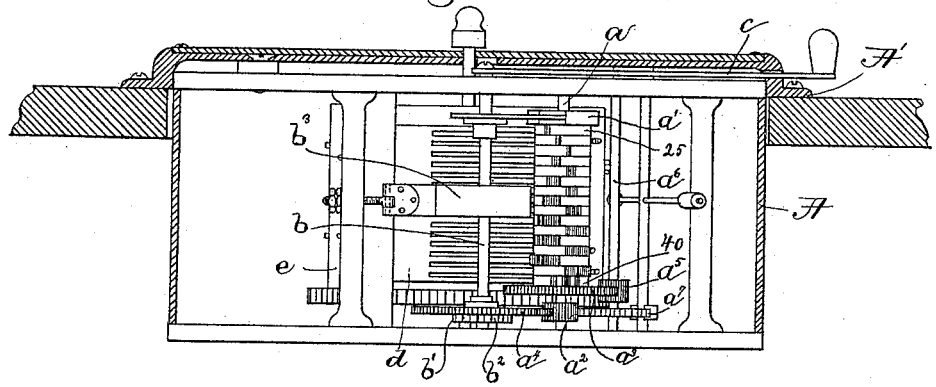
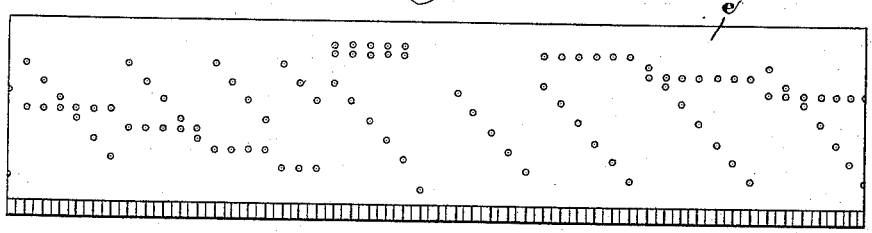
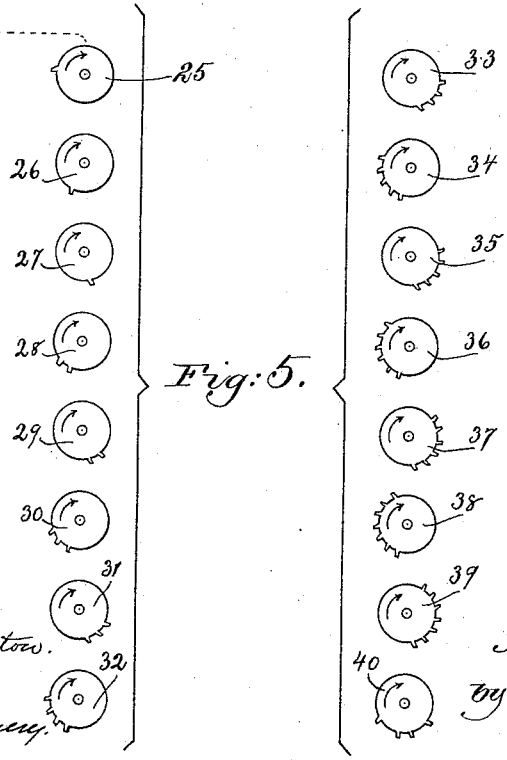

JOHN C. WILSON, OF BOSTON, MASSACHUSETTS, ASSIGNOR TO THE MUNICIPAL SIGNAL COMPANY, OF PORTSMOUTH, NEW HAMPSHIRE.

SIGNAL-TRANSMITTER.

SPECIFICATION forming part of Letters Patent No. 395,101, dated December 25, 1888.

Application filed September 3, 1888. Serial No. 284,401. (No model.)

*To all whom it may concern:*

Be it known that I, JOHN C. WILSON, of Boston, county of Suffolk, State of Massachusetts, have invented an Improvement in Signal-Transmitters, of which the following description, in connection with the accompanying drawings, is a specification, like letters on the drawings representing like parts.

In another application, Serial No. 284,402, filed by me concurrently with this, a multiple signal-transmitter is shown comprising a series of circuit-changing wheels, each having a single contact pen or portion and arranged to occupy different relative positions, and a series of contact-pens for the said wheels and a selecting-cylinder arranged to move certain combinations of pens into position to co-operate with the wheels to effect a different number of changes in the condition of the circuit.

The invention forming the subject-matter of this application has for its object to construct a novel form of signal-transmitter capable of accomplishing substantially the same results as accomplished by the aforesaid signal-transmitter.

In accordance with this invention a series of circuit-changing wheels are arranged upon a shaft, each having as many contact portions as desired to indicate a certain number. A series of contact-pens are employed, which are designed to be moved into position to co-operate with the circuit-changing wheels when desired, and the signal-selecting cylinder is also provided, having upon its surface studs or projections arranged to move the contact-pens into position to co-operate with the circuit-changing wheels. The contact portions of each wheel are arranged upon one-half or less of its periphery, and the wheels are preferably arranged upon a shaft alternately, or so that the contact portions for the signals extend in opposite directions.

Figure 1 shows in plan view a signal-transmitter embodying this invention; Fig. 2, a plan view of a signal-transmitter shown in Fig. 1, the dial being removed; Fig. 3, a side elevation of a signal-transmitter shown in Fig. 2, the inclosing-case being shown in vertical section; Fig. 4, a diagram laid out of the surface of the signal-selecting cylinder or drum, and Fig. 5 side views of the several circuit-changing wheels arranged in two vertical rows to save space on the drawings.

The inclosing-case A is of suitable size and shape to contain the operating parts, it having at or near its upper edge an outwardly-extended flange, A', by which it is supported. The shaft $a$ is journaled in the inclosing-case, and has fixed to it the several circuit-changing wheels, to be described.

A stop or check wheel, $a'$, is fixed to the shaft $a$, and also fixed to said shaft is a pinion, $a^2$, (see dotted lines, Fig. 2,) and a gear, $a^3$. The pinion $a^2$ is engaged and driven by a toothed wheel, $a^4$, fixed to a shaft, $b$, which is connected by a pawl and ratchet, $b'$, (see dotted lines,) with the main spring $b^3$ from which it derives its rotation. The hand-crank $c$ or winding-arm is also fixed to the shaft or sleeve carrying the ratchet-wheel $b^2$, so that as the said arm is swung from its normal into its extreme abnormal position, as represented by dotted lines, Fig. 2, the ratchet-wheel will be rotated and the spring wound, and as the arm returns to its normal position the wheel $a^4$ revolves. The gear $a^3$ engages a pinion, $a^5$, fixed to a shaft or arbor, $a^6$, upon which shaft is also fixed the escape-wheel, $a^7$, designed to co-operate with any suitable pallet. This train of gearing and spring forms the motor mechanism by which the shaft $a$ is revolved. A series of contact-pens, $d$, are provided, there being one pen for each circuit-changing wheel. A signal-selecting cylinder, $e$, is also provided, it having upon its surface suitable studs or projections arranged to move the pens $d$ into position to co-operate with the circuit-changing wheel.

Each circuit-changing wheel is designed to change the condition of the circuit to effect the transmission of a certain number, and each wheel therefore has as many contact portions as its number indicates. Part of the wheels are provided with projecting contact portions upon one half of the periphery only, while another part of the said wheels have projecting contact portions on the opposite half of the periphery only, and the said wheels are preferably arranged alternately upon the shaft, so that the contact portions of the successive wheels project in opposite directions.

In Fig. 5 will be seen the several wheels which I preferably employ in their relative positions, they being arranged herein in two vertical rows to save space on the drawings. In placing the wheels on the shaft wheel 25 will be at the end remote from the motor. Then the following wheels will be arranged in succession, 26 27 28 29 30 31 32 33 34 35 36 37 38 39 40. Wheels 26 28 30 32 34 36 38 will be the tens-transmitting wheels, and wheels 27 29, 31, 33, 35, 37, and 39 will be the units-transmitting wheels. The surface of the selecting-cylinder in this instance contains but very few studs or projections, they being arranged in rows, and there being one stud or projection in each row for the units and one for the tens.

If a number more than 99 is desired, additional wheels—such as herein shown at 25—would be employed, its contact portions being arranged on its periphery at a different point with relation to the following wheel or wheels, so as not to interfere—i. e., so that no two contacts will engage the contact-pens at the same time; but, as herein represented, only a small number of contacts can be placed on this wheel. This wheel 25 has but one contact portion, and hence such numbers as 112, 113, &c., can be transmitted, and for these numbers the signal-selecting cylinder will be provided with three studs or projections in each row, as best shown in Fig. 4.

By the signal-transmitter herein described a large number of signals may be transmitted easily with but a single dial and pointer.

By arranging the contact-points of the signal-wheels part on one side and part on the other it will be seen that by a single revolution of the shaft two, or, if desired, three, signal-wheels may successively effect changes in the circuit.

I have herein shown one wheel, as 40, to be used as a wheel for a special number, it being herein represented as formed to transmit number 121.

I claim—

1. In a signal-transmitter, the signal-selecting cylinder having thereon studs or projections arranged in rows, each row comprising two studs differently placed—one for units and one for tens—and a series of contact-pens, combined with a series of circuit-changing wheels, each having contact portions upon but a portion of its periphery, part of said wheels being the units-transmitting wheels and part being tens-transmitting wheels, the co-operating contact-pens being moved into engagement with the wheels, respectively, by the aforesaid studs or projections, substantially as described.

2. In a signal-transmitter, the signal-selecting cylinder, dial and pointer, and a series of contact-pens, combined with a series of circuit-changing wheels, part of which have contact portions upon one half or less of each periphery for units and another part of which have contact portions upon the opposite half or less of each periphery for tens, substantially as described.

3. In a signal-transmitter, the signal-selecting cylinder, dial and pointer, and a series of contact-pens, combined with a series of circuit-changing wheels, part of which are the units-transmitting wheels and part of which are the tens-transmitting wheels, the said wheels for the units and tens being arranged alternately upon the shaft, substantially as described.

4. In a signal-transmitter, the signal-wheels for units, and the signal-wheels for tens, and the signal-wheels for hundreds, combined with the series of contact-pens and the selecting-cylinder having thereon several rows of studs or projections, some rows comprising one stud, other rows two studs, and other rows three studs, substantially as described.

In testimony whereof I have signed my name to this specification in the presence of two subscribing witnesses.

JOHN C. WILSON.

Witnesses:
G. W. GREGORY,
F. L. EMERY.